United States Patent
Carey et al.

(10) Patent No.: US 11,151,258 B2
(45) Date of Patent: *Oct. 19, 2021

(54) SYSTEM AND METHOD FOR IDENTIFYING NETWORK SECURITY THREATS AND ASSESSING NETWORK SECURITY

(71) Applicant: ReliaQuest Holdings, LLC, Tampa, FL (US)

(72) Inventors: Marcus J. Carey, Round Rock, TX (US); Tolulope Oyeniyi, Austin, TX (US)

(73) Assignee: Reliaquest Holdings, LLC, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/550,723

(22) Filed: Aug. 26, 2019

(65) Prior Publication Data

US 2019/0384919 A1  Dec. 19, 2019

Related U.S. Application Data

(63) Continuation of application No. 15/653,293, filed on Jul. 18, 2017, now Pat. No. 10,395,040.

(Continued)

(51) Int. Cl.
*H04L 29/06* (2006.01)
*G06F 21/57* (2013.01)
(Continued)

(52) U.S. Cl.
CPC ............ *G06F 21/577* (2013.01); *G06F 21/50* (2013.01); *G06F 21/53* (2013.01); *G06F 21/55* (2013.01);
(Continued)

(58) Field of Classification Search
CPC ........ G06F 21/577; G06F 21/50; G06F 21/53; G06F 21/55; G06F 21/562; H04L 63/1433
See application file for complete search history.

(56) References Cited

U.S. PATENT DOCUMENTS 6,584,569 B2  6/2003  Reshef et al.
7,325,252 B2  1/2008  Bunker et al.
(Continued)

OTHER PUBLICATIONS

Notice of Allowance issued in related U.S. Appl. No. 14/837,033 dated Sep. 2, 2020.

(Continued)

*Primary Examiner* — Shawnchoy Rahman
(74) *Attorney, Agent, or Firm* — Brian J. Colandreo; Jeffrey T. Placker; Holland & Knight LLP

(57) ABSTRACT

A system and method of security assessment of a network is described. The system may include one or more security assessment computers controlled by a security assessor, and connected to a network, and first executable program code for acting as an agent on a first end device on the network. The first executable program code is configured to be executed by a browser application of the first end device, and is configured to collect software information, hardware information, and/or vulnerability information of the first end device and transmit the same to a first security assessment computer of the one or more security assessment computers. The information may be transmitted as part of a domain name server (DNS) request. The DNS request may include information identifying the first end device to thus allow modification of the first end device in response to analysis of the collected information.

20 Claims, 9 Drawing Sheets

Related U.S. Application Data

(60) Provisional application No. 62/363,537, filed on Jul. 18, 2016.

(51) Int. Cl.
  *G06F 21/50* (2013.01)
  *G06F 21/55* (2013.01)
  *G06F 21/56* (2013.01)
  *G06F 21/53* (2013.01)

(52) U.S. Cl.
  CPC ........ *G06F 21/562* (2013.01); *H04L 63/1433* (2013.01)

(56) References Cited

U.S. PATENT DOCUMENTS

| | | | |
|---|---|---|---|
| 8,370,918 B1 | 2/2013 | Doukhvalov et al. | |
| 8,407,471 B1 * | 3/2013 | Sobel .................. | H04L 61/1511 713/168 |
| 8,601,587 B1 | 12/2013 | Powell et al. | |
| 8,856,869 B1 | 11/2014 | Brinskelle | |
| 8,955,109 B1 | 2/2015 | Satish | |
| 9,021,008 B1 | 4/2015 | Andrus et al. | |
| 9,413,774 B1 | 8/2016 | Liu et al. | |
| 9,473,522 B1 | 10/2016 | Kotler et al. | |
| 9,619,649 B1 | 4/2017 | Yun | |
| 9,690,933 B1 | 6/2017 | Singh et al. | |
| 10,395,040 B2 | 8/2019 | Carey et al. | |
| 2003/0051163 A1 | 3/2003 | Bidaud | |
| 2005/0241000 A1 | 10/2005 | Kawauchi | |
| 2006/0075506 A1 | 4/2006 | Sanda et al. | |
| 2006/0155728 A1 | 7/2006 | Bosarge | |
| 2007/0033155 A1 | 2/2007 | Landsman | |
| 2010/0138925 A1 | 6/2010 | Barai et al. | |
| 2010/0324981 A1 | 12/2010 | Etchegoyen | |
| 2012/0016742 A1 * | 1/2012 | Jiang .................. | G06Q 30/0241 705/14.49 |
| 2013/0097706 A1 | 4/2013 | Titonis et al. | |
| 2013/0212435 A1 | 8/2013 | Qiu et al. | |
| 2013/0219493 A1 | 8/2013 | Banzhof | |
| 2013/0247133 A1 | 9/2013 | Price et al. | |
| 2013/0312094 A1 | 11/2013 | Zecheru | |
| 2013/0332880 A1 * | 12/2013 | Kim ................... | H04N 5/44513 715/781 |
| 2013/0347116 A1 | 12/2013 | Flores et al. | |
| 2014/0208425 A1 | 7/2014 | Palomaki | |
| 2014/0237599 A1 | 8/2014 | Gertner et al. | |
| 2016/0044057 A1 | 2/2016 | Chenette et al. | |
| 2016/0088019 A1 | 3/2016 | Li et al. | |
| 2016/0134653 A1 | 5/2016 | Vallone et al. | |
| 2016/0253500 A1 | 9/2016 | Alme et al. | |
| 2016/0306980 A1 | 10/2016 | Kotler et al. | |
| 2017/0013008 A1 | 1/2017 | Carey et al. | |
| 2017/0187743 A1 | 6/2017 | Madou et al. | |
| 2017/0316462 A1 | 11/2017 | McConnell et al. | |
| 2018/0018465 A1 | 1/2018 | Carey et al. | |

OTHER PUBLICATIONS

Hutchins et al, "Intelligence-Driven Computer Network Defense Informed by Analysis of Adversary Campaigns and Intrusion Kill Chains." Lockheed Martin Corporation, Nov. 21, 2010.

Moller A. Schwarz M amoeller@cs. au. d. Automated Detection of Client-State Manipulation Vulnerabilities. ACM Transactions on Software Engineering & Methodology. 2014;23(4):29:1-29:30. doi:10.1145/2531921. (Year: 2014).

Non-Final Office Action issued in related U.S. Appl. No. 14/837,033 dated Jul. 13, 2017.

Final Office Action issued in related U.S. Appl. No. 14/837,033 dated May 9, 2018.

Non-Final Office Action issued in related U.S. Appl. No. 14/837,033 dated Jun. 11, 2019.

Final Office Action issued in related U.S. Appl. No. 14/837,033 dated Jan. 10, 2020.

Notice of Allowance issued in related U.S. Appl. No. 14/837,033 dated May 27, 2020.

Non-Final Office Action issued in related U.S. Appl. No. 15/653,293 dated Apr. 4, 2019.

Notice of Allowance issued in related U.S. Appl. No. 15/653,293 dated Jun. 12, 2019.

* cited by examiner

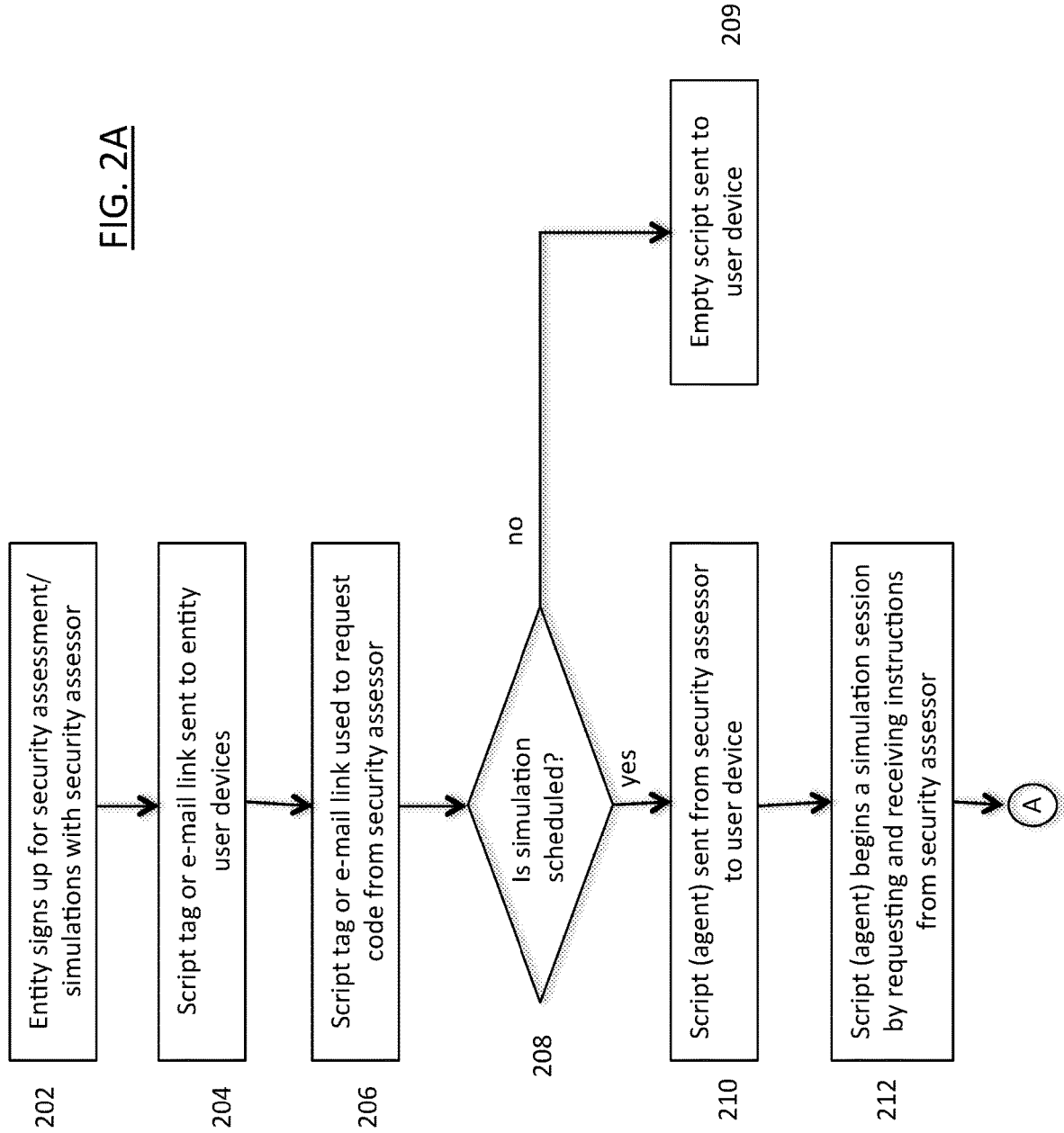

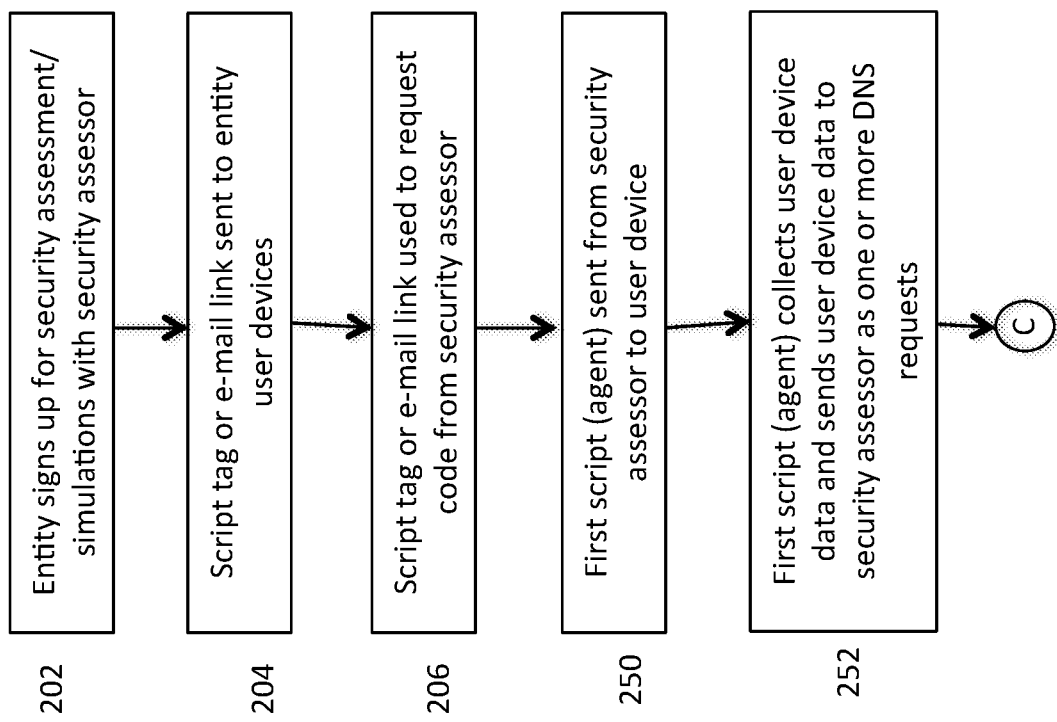

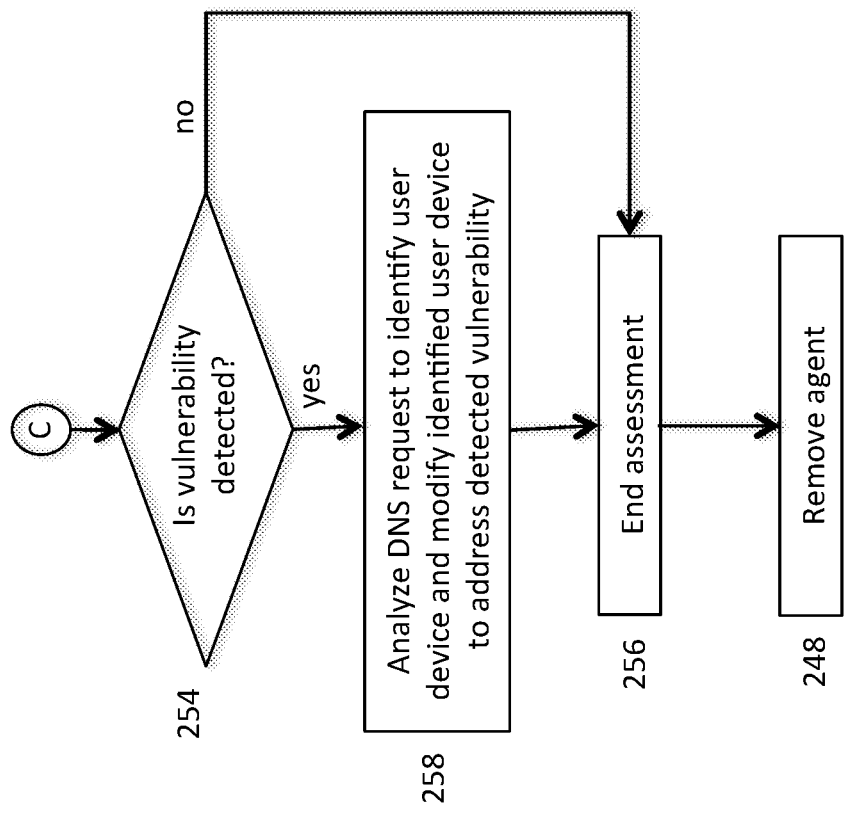

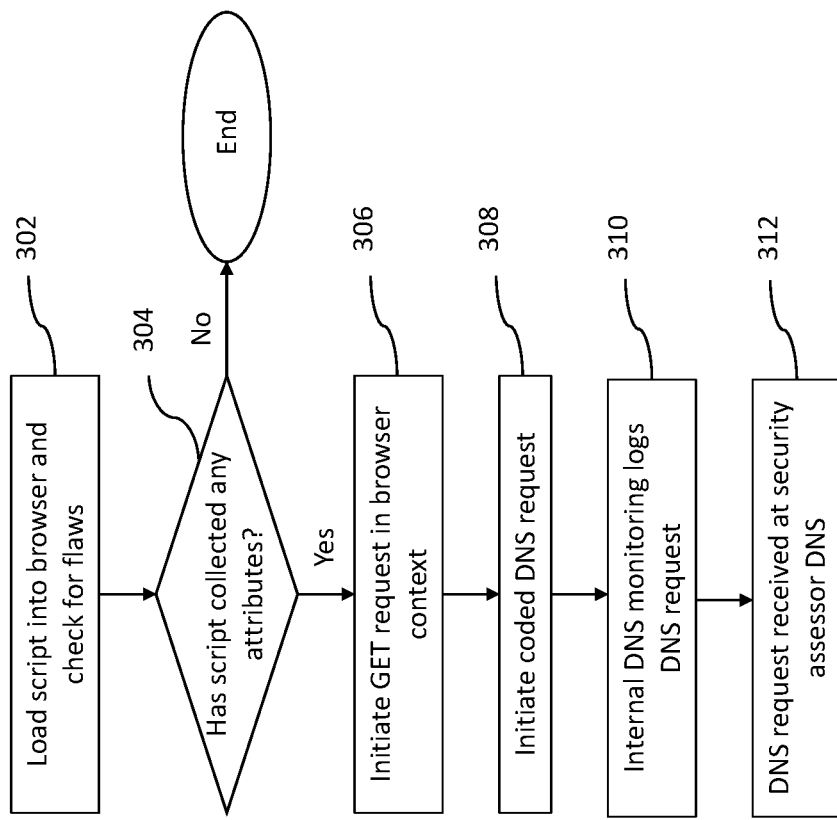

FIG. 3

| Artifacts | | | | | |
|---|---|---|---|---|---|
| Remote Host | Public IP Address | Private IP Address | Card Number | Card Type | Time Stamp |
| clear.threatcare.com | 12.345.67.89 | 87.65.43.21 | 12345678876544321 | Discover Card | 2016-08-08 14:27:19 UTC |
| clear.threatcare.com | 12.345.67.89 | 87.65.43.21 | 9876543212345670 | Mastercard | 2016-08-08 14:27:19 UTC |
| clear.threatcare.com | 12.345.67.89 | 87.65.43.21 | 123423453456345 | American Express | 2016-08-08 14:27:19 UTC |
| clear.threatcare.com | 12.345.67.89 | 87.65.43.21 | 1357246835794680 | Visa | 2016-08-08 14:27:20 UTC |
| clear.threatcare.com | 12.345.67.89 | 87.65.43.21 | 3216549871123456 | Diner's Club International | 2016-08-08 14:27:20 UTC |
| clear.threatcare.com | 12.345.67.89 | 87.65.43.21 | 2345345645675670 | Mastercard | 2016-08-08 14:27:20 UTC |
| clear.threatcare.com | 12.345.67.89 | 87.65.43.21 | 1058322569604330 | Mastercard | 2016-08-08 14:27:19 UTC |
| clear.threatcare.com | 12.345.67.89 | 87.65.43.21 | 3210987654321098 | Discover Card | 2016-08-08 14:27:19 UTC |
| clear.threatcare.com | 12.345.67.89 | 87.65.43.21 | 5108233596094430 | Mastercard | 2016-08-08 14:27:19 UTC |

SYSTEM AND METHOD FOR IDENTIFYING NETWORK SECURITY THREATS AND ASSESSING NETWORK SECURITY

CROSS-REFERENCE TO RELATED APPLICATIONS

This application is a continuation application of U.S. patent application Ser. No. 15/653,293, filed Jul. 18, 2017, the entire contents of which are incorporated by reference herein in their entirety, which claims priority to U.S. Provisional Application No. 62/363,537, filed Jul. 18, 2016, the entire contents of which are incorporated by reference herein in their entirety. This application is related to U.S. patent Ser. No. 14/837,033, filed Aug. 27, 2015, the contents of which are incorporated by reference herein in their entirety.

BACKGROUND

The present disclosure is directed toward a system and method of assessing security of a network, and performing security threat simulations.

In the field of cyber security, threats have evolved such that they are usually complex interactions between an assailant (the "threat actor") and the target system, such as a computer network (the "target network") and/or devices (e.g., user devices, intermediate target devices, or defensive devices) that they are attacking.

At a high level, the threat actor can use a number of techniques to breach the target network, bypassing the defensive devices and either installing malicious code on a target system or directly accessing the target system. During this process, one or more intermediate target devices (e.g., DNS servers, routers, etc.) may be used to gain progressively deeper access to the target network in order to approach the target system. Once the target system is compromised, the threat actor can then act upon target data and/or target systems or intermediate systems in some way that achieves a malicious goal. Exemplary actions on the target data can include, but are not limited to: theft (or data exfiltration), destruction of data, modification of data, preventing access to information, or some combination thereof.

There are a number of means by which a threat actor can gain access to a target network, some of which include: gaining access to credentials for normal or privileged access to the target network, gaining access to credentials for normal or privileged access to the target devices or systems on the target network, locating and exploiting flaws in the target network or external systems, and conspiring with users who have legitimate access to the target network or target devices or systems. There are numerous combinations of these mechanisms which can be used to access, exfiltrate, modify, or destroy data on target systems.

Due to the wide variety of mechanisms that can be used by a threat actor to attack a network, many defensive devices have been created in an attempt to block or monitor these mechanisms. For example: Firewalls, for blocking access from or to unwanted locations to or from the defended networks; Intrusion Detection Systems (IDS), for detecting suspicious traffic on the defended networks; Intrusion Prevention Systems (IPS), for actively disrupting suspicious traffic on the defended networks; Data Loss Prevention (DLP), for actively disrupting the transmission of specific data from the defended networks (or defended devices or other devices on the network); Anti-Virus (AV), for detection and removal of malicious code which is downloaded onto network devices such as user devices; Domain Name System Filtering (DNS Filters), for the prevention of access by network devices such as user devices, to known-malicious systems, or suspect locations on the Internet; and Security Incident and Event Management, for the aggregation of event data and the coordination of incident response.

Each of these defensive devices has been created to act upon specific types of threats and when used in combination with others can theoretically help prevent, limit, or detect the attack of a threat actor, resulting in better safety for target data and target systems. These systems, when layered together, create a system of defense known as Defense-in-Depth, where each layered defensive device prevents a deeper level of attack. As described in Hutchins et al., "Intelligence-Driven Computer Network Defense Informed by Analysis of Adversary Campaigns and Intrusion Kill Chains," Lockheed Martin Corporation, pp. 1-14, which is incorporated herein by reference in its entirety, a good practice of using these defenses is to use a layered defense to stop the threat actors at the earliest point in the attack, and to provide the earliest warning of the presence of threat actors attempting to access a defended network.

The effectiveness of such a defense-in-depth is predicated upon the effectiveness of every layer of security. Much like the layers of an onion, if there is one opening in each layer, it can be permeated, and a liquid will locate any opening in a layer. However, if any one layer has no holes, it can keep back the intrusion. If any of the defensive devices is ineffective or misconfigured, it can create an opening sufficient for the threat actor to successfully attack the target network, access the target system(s) and reach the target data.

To maintain an adequate defense-in-depth, a target organization (also described as a target entity) should take measures to maintain each of its defensive devices in accordance with best practices, making sure that software is up-to-date, systems are appropriately configured on its network, and access is appropriately controlled. Cooperative systems may need to be configured to communicate and cooperate correctly with each other.

Because of this complexity, target organizations typically take action to prepare and assess their security posture in order to locate holes in their security systems. Over time, there have developed two key practices for this assessment: tabletop exercises and penetration tests. The two are used, often together, to attempt to assess the vulnerabilities in a defended network and to act as a jumping-off point for remediation of such vulnerabilities. However, despite these practices, a steady stream of successful cyber attacks still occurs, targeted toward organizations that spend millions of dollars pursuing each of these avenues.

Tabletop exercises typically include a detailed scenario or "war game" played out on a literal or figurative table between people who know how the security systems are supposed to respond. By having an internal security team walk through the threat scenario(s), they attempt to locate holes in how the systems will work to defend them. One problem with tabletop exercises is that they test the theoretical function of the systems under test, not the actual function. In actual operation, a manufacturer's defensive device may not be effective against a specific class of threat, or even a specific threat. However, if a tabletop exercise concludes erroneously that the defensive device is expected to successfully defend against the threat, this would lead to a false sense of security and decrease the likelihood that appropriate mitigation would be implemented. In addition, even if the defensive device would be effective against the threat when correctly installed, tabletop exercises do not actively test the placement, configuration and installation of defensive devices, leaving open the possibility of a capable, but inappropriately configured or installed, defensive device not being as effective as portrayed in the tabletop exercise. Tabletop exercises may not require additional equipment, but typically require time from cyber-security personnel to execute, and often require substantial investment of time or external resources to create the scenario(s) ahead of time. They are thus costly and usually done infrequently.

Penetration tests are "live fire" exercises in which "White Hat Hackers" perform as threat actors and are tasked with attempting to infiltrate the target network, access the target systems, and retrieve a sample of target data to prove that network defense is ineffective, thus locating a route that should be remediated. The result of a penetration test is often the target data (as proof) and a list of the successful and unsuccessful measures taken to gain access to the target data. Penetration tests often involve actual hackers acting from outside the target network and hacking into the network (hopefully while maintaining good intentions) in order to assess security.

Due to the external nature of the penetration tests, they tend to be expensive to execute and are typically undertaken infrequently (usually once or twice a year). In addition, they usually stop at the first successful breach, resulting in a single successful breach log and one or more failed breach attempts. The successful breach log contains information that might be used to prevent a similar attack in the future, while the failed breach logs provide some insight into what worked against the penetration testers attempts. These tests often uncover only very specific paths that may result in security breaches, such that those specific paths can be addressed by a security solution. However, they are less likely to discover patterns or more general, pervasive security holes in a system. In addition, because these are "live fire" exercises, it is possible that data or systems will be harmed or degraded during or after a penetration test. For example, even if the tester has good intentions, these tests often involve installing harmful software programs onto end user computer systems or other target system devices, that may continue to serve as a security threat even after the testing is complete. These software programs typically need to be searched for by a user or network administrator and manually removed in order to remove them as potential security threats after testing is complete.

As discussed above, each of these above two methods has limitations in effectiveness and may also cause unintended problems. In addition, due to the expense and coordination, both of these testing methodologies are infrequently used by organizations, perhaps one to four times per year. They also typically require significant human involvement at all stages. In today's rapidly-changing world, networks change daily, software is updated weekly, and threats may change by the hour. Each of these factors may render invalid the results of the most recent penetration test or tabletop exercise, all while requiring significant investment in time and resources, thus leaving the target organization with little or no reasonable knowledge of their current defensive posture.

To fill some gaps between penetration tests and tabletop exercises, a number of services have evolved that can provide some interim testing capability. In particular, online vulnerability scanning provides for testing of specific known vulnerabilities against equipment visible and accessible from the network. These scanners tend to target Internet-facing servers and seek out well-known problems to prevent unauthorized access to those systems, and are thus external online vulnerability scanning. Some providers have extended this concept into the intranet space, providing vulnerability scanning aimed at targeting internal servers and even clients for known vulnerabilities, thus internal online vulnerability scanning. Vulnerability scanning, however, is not a passive operation, and as such can produce real-world failures that can impact operations inside of the organization. Further, for use on intranets, these scanners typically require the introduction of hardware or software to the defended network, which are often remotely controlled and updated, potentially creating an increased external presence from which a network can be attacked.

Thus, it would be beneficial to perform network security assessment in a manner that avoids various of the inadequacies described above.

SUMMARY

In some embodiments, a security assessment system for a computer network includes one or more security assessment computers controlled by a security assessor, and connected to a network, and first executable program code for acting as an agent on a first end device on the network, the first executable program code configured to be executed by a browser application of the first end device. In some embodiments, the first executable program code is configured to initiate a simulation by requesting information from at least a first security assessment computer of the one or more security assessment computers.

The security assessment system may include a storage at one of the one or more security assessment computers, the storage storing an entity profile indicating security assessment and simulation services to be administered to an entity with which the first end device is associated.

The first executable program code may include instructions that, when executed by the browser application, cause the browser application to simulate the implementation of one or more security threat techniques, tactics, or practices. For example, the one or more security threat techniques, tactics, or practices may include at least one of: attempting to exfiltrate data from a sub-network that includes the first end device; attempting to perform a lateral scan of the sub-network; and attempting Domain Name System Server (DNS server) exfiltration of data from the sub-network. A command and control server may comprise the first security assessment computer, and in some embodiments is configured to receive a request from the first executable program code executed by the browser application, and to send instructions to the browser application in response, to begin simulating the one or more security threat techniques, tactics, or practices.

The security assessment system may include one or more bot servers configured to receive information associated with a simulation initiated by the first end device and to report simulation results to one of the one or more security assessment computers controlled by the security assessor.

The first executable program code may include an indicator used to automatically delete the first executable program code.

In some embodiments, second executable program code for serving as an agent on a second end device on the network is configured to be executed by a browser application of the second end device, and the second executable program code is configured to initiate the implementation of a simulation by requesting information from the first security assessment computer. The first end device may be a personal communication device, and the second end device may be a personal communication device.

A method for security assessment of a computer network may be performed. In some embodiments, the method may include transmitting first executable program code from a security assessor that controls one or more security assessment computers on a network to a first end device on the network, the first executable program code for acting as an agent on the first end device, and the first executable program code configured to be executed by a browser application of the first end device. In some embodiments, the first executable program code is configured to initiate the implementation of a simulation by requesting information from at least a first security assessment computer of the one or more security assessment computers.

According to some embodiments, the method includes storing by the security assessor an entity profile indicating security assessment and simulation services to be administered to an entity with which the first end device is associated.

For example, the entity profile may indicate at what times certain simulations should be executed by particular agents, and those simulations are executed automatically based on the times.

In some embodiments, the first executable program code includes instructions that, when executed by the browser application, cause the browser application to simulate one or more security threat techniques, tactics, or practices. For example, the one or more security threat techniques, tactics, or practices may include at least one of: attempting to exfiltrate data from a sub-network that includes the first end device; attempting to perform a lateral scan of the sub-network; and attempting Domain Name System Server (DNS server) exfiltration of data from the sub-network.

A method for security assessment of a computer network may further include receiving a request from the first executable program code executed by the browser application, and sending instructions to the browser application in response, to begin simulating the one or more security threat techniques, tactics, or practices.

The method may additionally include receiving, at a bot server, information associated with a simulation initiated by the first end device, and reporting, from at least the bot server, simulation results to the security assessor.

The method may also include automatically deleting, by the browser application, the first executable program code from the first end device after the simulation has completed.

In some embodiments, the method includes transmitting second executable program code from the security assessor to a second end device on the network, the second executable program code for acting as an agent on the second end device, the second executable program code configured to be executed by a browser application of the second end device. In some embodiments, the second executable program code is configured to initiate a simulation by requesting information from at least the first security assessment computer.

In addition, the method may include receiving, by the security assessor, simulation results as a result of the simulation initiated by the first executable program code and as a result of the simulation initiated by the second executable program code, and performing a security assessment based on the received simulation results.

In some embodiments, the first executable program code is sent to the first end device based on a request received by the first end device, and the request is implemented with a code associated with the security assessor and previously sent to the end device.

A method of assessing security of a network, according to some embodiments, may include, at a security assessor system, receiving, from browser-executed executable program code executing on a plurality of end devices, a plurality of respective requests, each request for initiating simulation of one or more security threat techniques, tactics, or practices, wherein the plurality of end devices are part of a sub-network; and in response to the plurality of requests, sending respective instructions to the respective end devices instructing each browser-executed executable program code to simulate one or more security threat techniques, tactics, or practices.

The method may further include receiving, by the security assessor, results of the respective simulated security threat techniques, tactics, or practices, and based on the results, assessing the security of the sub-network.

In some embodiments, the browser-executed executable program code is automatically removed from the plurality of end devices.

A method of assessing security of a network, according to some embodiments, may include distributing a plurality of agents in the form of browser-executable program code to a respective plurality of end devices on a sub-network of a network, as a result of execution of the agents by browser applications on the end devices, performing a plurality of simulated security threat techniques, tactics, or practices on the sub-network, receiving information derived from the simulated security threat techniques, tactics, or practices and transmitted through the network, and based on the received information, assessing the security of the sub-network.

In some embodiments, the method further includes automatically removing the agents from their respective plurality of end devices.

BRIEF DESCRIPTION OF THE DRAWINGS

In the drawings, like numbers refer to like elements throughout.

FIGS. 2A-2I illustrate various steps of a method of assessing network security, according to certain exemplary embodiments.

FIG. 3 illustrates an example of a table or artifacts that can be selected to search for security-related information.

DETAILED DESCRIPTION

Figure 1:
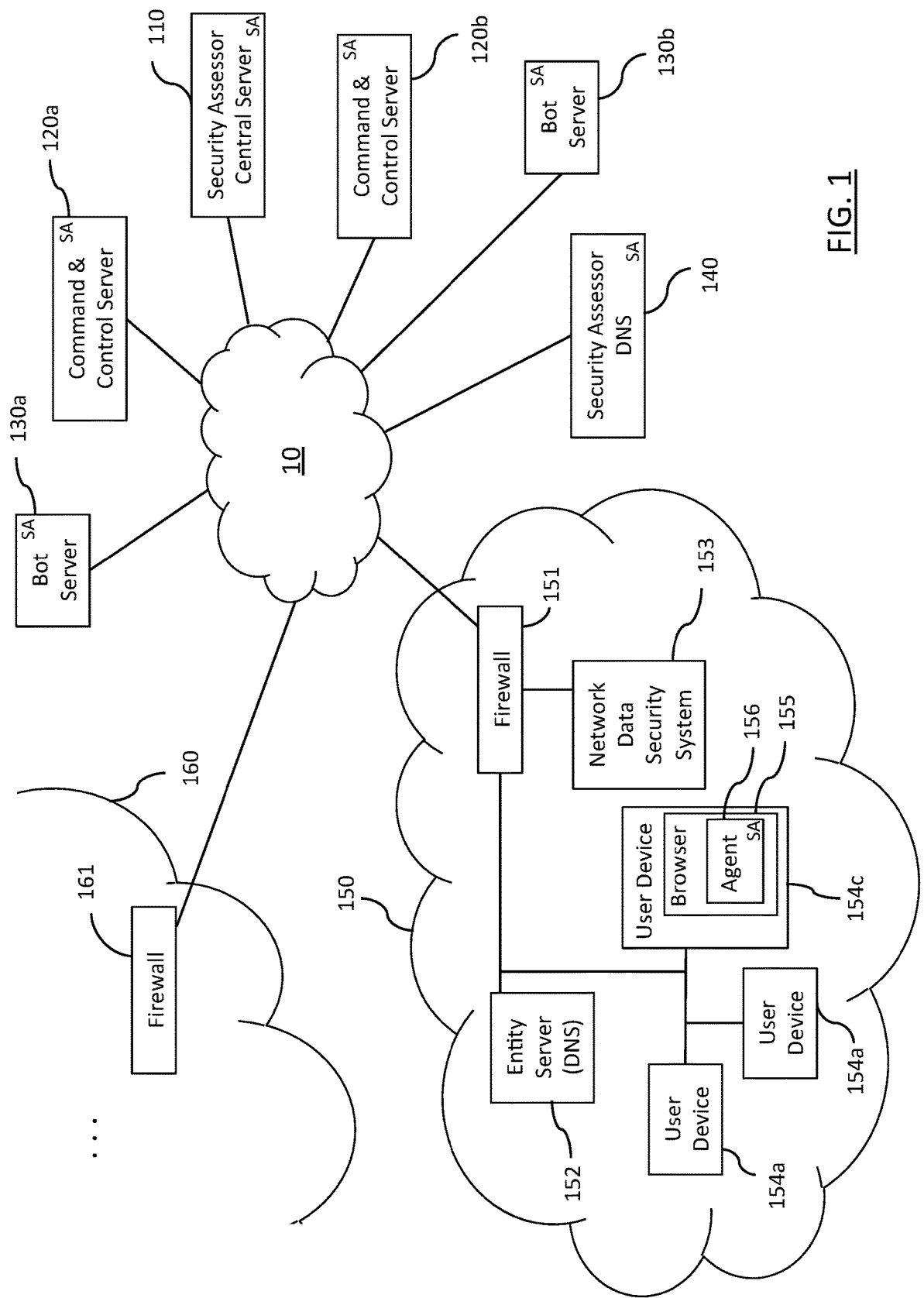
FIG. 1 illustrates a system for assessing network security, according to certain exemplary embodiments.

The present disclosure will now be described more fully with reference to the accompanying drawings, in which various embodiments are shown. The invention may, however, be embodied in many different forms and should not be construed as limited to the example embodiments set forth herein. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/".

It will be understood that, although the terms first, second, third etc. may be used herein to describe various elements, systems, components, and/or steps, these elements, systems, components, and/or steps should not be limited by these terms. Unless the context indicates otherwise, these terms are only used to distinguish one element, system, component, and/or step from another element, component, system, and/or step, for example as a naming convention. Thus, a first element, system, component, and/or step discussed below in one section of the specification could be termed a second element, system, component, and/or step in another section of the specification or in the claims without departing from the teachings of the present disclosure. In addition, in certain cases, even if a term is not described using "first," "second," etc., in the specification, it may still be referred to as "first" or "second" in a claim in order to distinguish different claimed elements from each other.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "connected" or "coupled" to another element, it can be directly connected or coupled to or on the other element or intervening elements may be present. In contrast, when an element is referred to as being "directly connected" or "directly coupled" to another element, or in "direct communication" with another element, there are no intervening elements present. Other words used to describe the relationship between elements should be interpreted in a like fashion (e.g., "between" versus "directly between," "adjacent" versus "directly adjacent," etc.).

Terms such as "same," or "equal to," as used herein when referring to certain features do not necessarily mean exactly identical, but are intended to encompass nearly identical features, within acceptable variations that may occur, for example, due to minor time delays, functionality variations, or other minor variations. The term "substantially" may be used herein to reflect this meaning.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 depicts a system for implementing simulations of security threats on a network, according to certain embodiments.

A method and system for simulating security threats may be implemented on a network 10, such as the Internet. Within the network 10, a plurality of devices may be associated with and/or under the control (e.g., partial or complete control) of a security assessor SA. For example, a security assessor central server 110, command and control servers 120a and 120b, bots 130a and 130b, and a security assessor domain name system server (DNS) 140 may be associated with a security assessor SA. Together, these may be referred to as a security assessor system. A security assessor may be, for example, a company that assesses the security of a network. The security assessor may simulate techniques, tactics, and practices (TTP) of threat actors, also referred to as security threat techniques, tactics, and practices, to perform network security assessments.

For example, security assessor central server 110 may include a computer system connected to the network 10 including one or more computers that implement and/or operate security threat simulations (e.g., TTPs of simulated threat actors, also referred to herein as security threat TTPs, or threat actor TTPs) for the security assessor. The security assessor may be, for example, a company that provides security services to one or more entities, such as companies, that use the Internet. The security assessor may be part of the entity to which it provides security services to. In some cases, the security assessor may merely assess network security, but a security assessor is not limited thereto, and in some cases the security assessor may also control or operate a security system for one or more networks. The security assessor central server 110 may store entity profiles for entities that have signed up for security services (e.g., security assessment services) with the security assessor. These profiles may indicate which types of security services (e.g., simulation and assessment services) each enrolled entity has signed up to receive. The security assessor central server 110 may store, for example in memory, various data and/or computer program code that reflects the services that different entities have signed up for, as well as instructions regarding how to carry out those services.

The command and control servers 120a and 120b may each include one or more computers connected to the network 10 that store, for example in memory, various computer program code that instructs the hardware of the command and control servers 120a and 120b to perform certain tasks in order to execute various security threat simulations. As such, a hardware computer readable medium, such as a programmable memory, may store executable program code configured to instruct one or more of command and control servers 120a and 120b to carry out certain security threat simulations. In certain embodiments, the command and control servers 120a and 120b are under the control of the security assessor. For example, in certain embodiments, the command and control servers 120a and 120b may be servers that are entirely under the control of the security assessor. The command and control servers may also be referred to as simulation management systems, or simulation managers.

The bots 130a and 130b, also described as bot servers, may each include one or more computers connected to the network 10 and having simulation program code stored thereon. For example, a bot may be a single computer on the network 10. The simulation program code may be configured to receive certain information from user devices, described later below, and to send out data and/or reports to a command and control server 120a or 120b. The bots may be standalone computers, or may be programs executing on one or more computers. The bots may be described as security operation simulation devices.

The security assessor DNS 140 may include one or more computers connected to the network 10 and in communication with security assessor central server 110, and command and control servers 120a and 120b. The DNS 140 may also be in communication with bots 130a and 130b. In certain embodiments, DNS 140 may be used to conduct certain DNS-type security simulations, described further below.

The various above-described components associated with the security assessor communicate over a network such as the Internet, using various communication protocols, and may communicate with each other to carry out the various processes described herein.

Network 10 also includes one or more sub-networks 150 and 160. Each of these networks may be formed as physical networks, or virtual networks. For example, a sub-network may be a local area network (LAN) including computers connected to a central server via wired or wireless connections. As another example, a sub-network may be a Virtual Private Network (VPN) that includes various devices connected to a central server from different locations in either a wired, wireless, or combined manner over the Internet.

In certain embodiments, a sub-network 150 may include various computers connected to the Internet (e.g., network 10) through a firewall 151. The sub-networks, such as 150 or 160, may be associated with and/or under at least partial control of an entity such as a company for example. Because simulations are designed to target sub-networks 150 or 160, these networks may be referred to as target systems. A sub-network such as sub-network 150 may include a firewall 151, an entity server 152, a network data security system 153, and one or more user devices 154a, 154b, and 154c.

Firewall 151 may include all or part of one or more computers that provide standard network firewall services to the entity. Firewall 151 may be implemented, for example, within communication hardware and/or software of a computer that provides the sub-network 150 access to the Internet. Firewall 151 may include various security features that control communications going out of, or coming in to, network 150. Though an example sub-network 150 is shown that includes a firewall 151, a sub-network need not include a firewall to use various aspects the security threat simulation and assessment system and methods described herein.

Entity server 152 may be a server run by the entity, such as a company. Entity server 152 may be a server computer system (e.g., one or more computers), that houses the entity's website, stores the entity's files, and provides other network services for the entity. In certain embodiments, entity server 152 includes a Domain Name System Server (DNS server).

Network data security system 153 may provide additional security measures to the entity. For example, network data security system 153 may include one or more computers in sub-network 150, and/or may include certain programs or other components installed within sub-network 150 (e.g., included in one or more of firewall 151, entity server 152, and user devices 154a, 154b, or 154c, and/or in other devices on sub-network 150 such as switches, routers, or other network components), configured to perform network security monitoring, such as intrusion detection, intrusion prevention, DNS filtering, firewalls, sandboxing, data loss prevention, antivirus, or other known security methods. Examples of some of these and other security methods are described in Hutchins et al., mentioned previously. Though an example sub-network 150 is shown that includes a network data security system 153, a sub-network need not include a network data security system to use various aspects of the security threat simulation and assessment system and methods described herein.

User devices 154a, 154b, and 154c may be computers used by end-users, such as employees of a company. User devices 154a, 154b, and 154c may have browser capabilities, for example by including browser applications for communicating over the Internet or other networks. For example, user devices 154a, 154b, and 154c may be desktop computers, laptop computers, tablet computers, smart phones, or other types of personal electronics devices with network communication capabilities (any of which may be described herein as personal communication devices). User devices 154a, 154b, and 154c, also referred to as end user devices, or more generally as end devices, may be configured to communicate with entity server 152, and/or to access the Internet through firewall 151. Certain of user devices 154a, 154b, and 154c may be directly connected to entity server 152 via, for example, a direct wired or wireless connection (e.g., wired or wireless LAN), or may be connected to entity server 152 through a virtual private network (VPN) or other secure network connection through an external network such as the Internet. In addition, though it is particularly beneficial to implement various of the disclosed embodiments on end user devices, for example, because they are readily available and are often pre-configured with software such as Internet browsers, that can be used to implement various of the disclosed security threat simulations, the various aspects described as occurring on end user devices can also be implemented on specialized devices that may be included in a sub-network. For example, an end device can be installed in a system such as an industrial control system, that can provide the same or similar functionality as a user device described in connection with the various embodiments herein. User devices or other devices that host agents for simulated TTPs may be generally referred to as hosts or host computers. It should be noted that user devices 154a, 154b, and 154c may communicate with network 10 by using a server, such as entity server 152. However, in certain embodiments, a server need not be used to allow user devices to communicate with a network 10 such as the Internet. For example, user devices may communicate through a router or other device that provides network connectivity, without communicating with an entity server. For example, user devices may connect through a router to an external DNS server outside sub-network 150 in order to access an external network such as the Internet.

Each of user devices, 154a, 154b, and 154c may include software applications, as well as hardware, that allow the devices to communicate within sub-network 150, as well as over the Internet. For example, the user devices may include one or more browser applications 155, such as Google Chrome®, Safari®, or Firefox®, that provide access to the entity's network and the Internet. As described in more detail below, a browser application 155 can allow for an agent 156 to be executed by the browser application, within the browser framework, to implement various security simulations. In the case of a non-user end device, a headless browser can be used (e.g., a browser that runs without the need for a display or user interaction). The agent may be associated with the security assessor, as will be described below in more detail. Using the browser, various web pages can be retrieved, and various operations can be executed, such as DNS requests, rendering web pages, running executable code such as JavaScript, and various other operations.

The various hardware devices and software programs shown in FIG. 1 and labeled as "SA" may be part of a security assessment system that includes a plurality of security assessment computers and security assessment executable programs that assist in providing the security-related simulations and assessments described herein. The security assessor system may also be connected to a second sub-network 160, that includes firewall 161, and various other components (not shown) which may be similar to those depicted in sub-network 150.

Though a particular number of certain components are shown, such as two command and control servers, two sub-networks, two bots, three user devices, etc., these are exemplary only, and additional or fewer of these components may be included in the system. Also, these components can be located at different physical and/or geographical locations. For example, security assessor central server 110 may be located in one country or continent (e.g., the United States), while the sub-networks may be located in different countries or continents, such as the United States and Brazil, and the command and control servers and bots may be located across a variety of countries and continents, such in France, Russia, China, etc.

In certain embodiments, for example, a first wired network including at least one server and certain additional devices of an entity's sub-network (e.g., sub-network 150) may be in one location (e.g., North America), a second wired network including at least one other server and other wired devices of the entity's sub-network may be in another location (e.g., Europe), and various wireless devices that are part of the entity's sub-network may be in various other locations around the world. In one example of such networks, a system such as a virtual private network (VPN) may be used that provides a same or similar firewall for all devices that are part of the sub-network but are not connected directly to an entity server via a wired network.

FIGS. 2A-2I illustrate exemplary methods of assessing network security by performing network security assessment which may include performing network security simulations such as simulating techniques, tactics, and practices of threat actors.

Starting with FIG. 2A, an entity, such as a company, government organization, educational institution, etc., signs up for security assessment and simulation services with a security assessor (step 202). The security assessor may be, for example, a company that provides security services. For example, the security assessor may own and/or control security devices, which may include hardware and/or software, connected to the Internet, such as the security assessor central server 110, command and control servers 120a and 120b, bots 130a and 130b, a security assessor DNS 140, and agent 156, described in FIG. 1.

In signing up for the security services, the entity may select a package that includes certain security assessments and simulations to be performed on the entity's network. For example, the entity may select for a set of security simulations to be performed at particular times (e.g., perform an exfiltration simulation, lateral scan simulation, and DNS exfiltration simulation every x days at one or more particular times of day). Information reflecting the entity's security package may be stored at the security assessor's system, for example on the security assessor central server 110 and/or one or more command and control servers 120a, 120b, etc. For example, this information may include certain program code, markup language code, or instructions intended to be sent to user devices 154a, 154b, 154c, etc., may include additional program code, markup language code, or instructions to be added to one or more web pages of an entity's website, and may include an entity profile, and various databases of information reflecting the services ordered.

In step 204, pieces of code are sent to entity user devices. For example, in certain embodiments, when an entity signs up for security services with a security assessor, the security assessor will send certain program or markup language code, such as <script> tags, which may be sent as part of a template, to be added to a web page of the entity's website. For example, the code may be a <script> tag for calling a script at a remote location when the web page is accessed. In certain embodiments, an entity may opt to place the code on a web page of the entity's website that is often accessed by entity users. For example, if the entity is a company that has an internal company website, the code can be placed on a homepage for the internal company website, such that most or all employees of the company who access the company's website will access the web page that includes the code. It should be noted that in certain embodiments, the code described in connection with step 204 can be markup language (also referred to herein as markup language code) including for example, a tag and data such as a web address or other data associated with the tag.

In certain embodiments, rather than a code in a web page, a link may be sent in an e-mail to an entity user device. In such a case, the link can be sent in an e-mail from the entity server to the entity user device, or in some cases can be sent from the security assessor (e.g., from the security assessor central server 110 or from a command and control server 120a or 120b). The link may include, for example markup language code that causes a user's device to request information from a security assessor and open the responsive information in a browser.

In step 206, the <script> tag or e-mail link is used to request code from a security assessor. For example, a browser receiving the <script> tag may automatically send a request to a command and control server 120a or 120b to request executable program code for performing a security simulation. Or, upon selection of a link in an e-mail or other message, a user device may send such a request.

In step 208, the recipient of the request, which may be a command and control server 120a or 120b, determines based on the request if a simulation for the requesting entity is scheduled. For example, associated with the entity's profile, the security assessor may store information that recognizes the requesting entity or entity user device based on the received request (e.g., based on one or more of an address (e.g., internal and/or external address) of the requesting device, or a browser fingerprint, etc.), and as a result looks up the entity profile to determine if any security simulations are scheduled.

In step 208 (no), if no simulation is scheduled, then in one embodiment, the security assessor (e.g., a command and control server computer) sends a script back to the requesting user device that may be an empty script. As a result, no simulation occurs. In another embodiment, however, no empty script needs to be sent.

In step 208 (yes), on the other hand, if it is determined that a security simulation is scheduled, then a script (e.g., program code) is returned to the user device (step 210), for execution in a browser of the user device. For example, if the script was returned as a result of a <script> tag on a web page, then the script may run in the web page (e.g., and may not be noticeable to a user), or a new web page may open (in the same browser window, or in a new browser window, for example) that runs the script. The returned program code may be referred to as an agent. For example, in certain embodiments, the returned program code is JavaScript code configured to execute within the browser environment. Other types of script can be used, such as a non-resident program that runs in a browser, such as Native Client (NaCl), or other plug-ins. The program code may be configured to execute in the background, so that a user is unaware of its executing. In some embodiments, the program code may have an indicator used to automatically delete the program code, such as an associated expiration date, which may be set to a date prior to the date on which it is transmitted to the user's browser. In this manner, the agent, which as described below may perform various functions to simulate a TTP of threat actors, may be automatically and permanently deleted from the user device (e.g., based on an expired expiration date) as soon as the web page is exited, the browser window is closed, and/or the browser application is closed. Other methods may be used to ensure that the received program code (e.g., the agent) is permanently removed from the user device without the need for user interaction, and without remaining on the user device for longer than needed.

In step 212, the script (i.e., agent) begins, or initiates, a simulation session by requesting instructions from the security assessor (e.g., from a command and control server 120a or 120b), and receiving the instructions from the security assessor. As described in more detail below, the instructions may be instructions for performing certain simulations, for example according to the security package associated with the entity associated with the agent. For example, the instructions may include an indication of operations to perform, target destinations, payload (e.g., information to be retrieved and/or distributed), and timing.

Figure 2D:
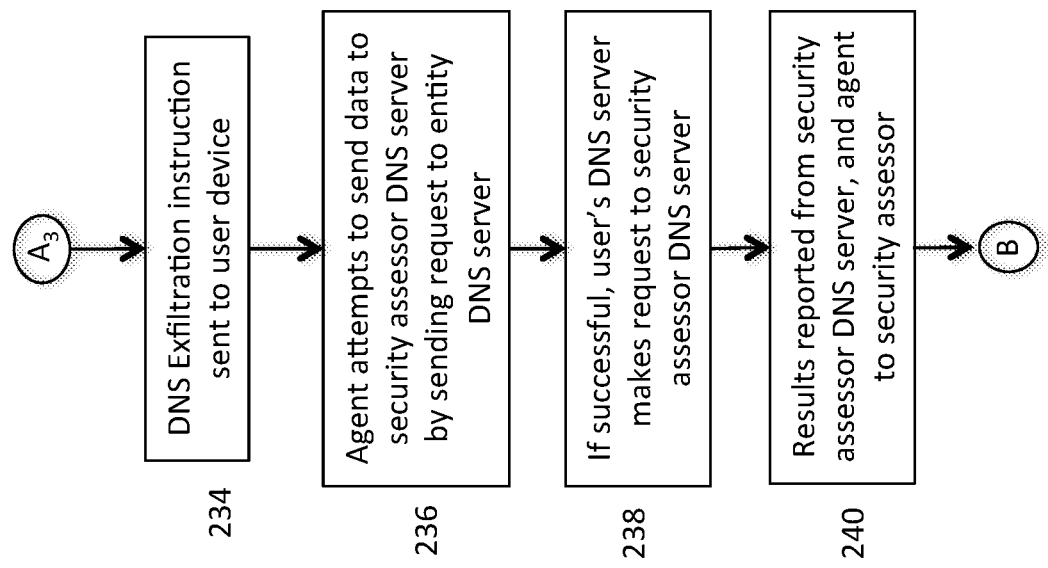
Figure 2C:
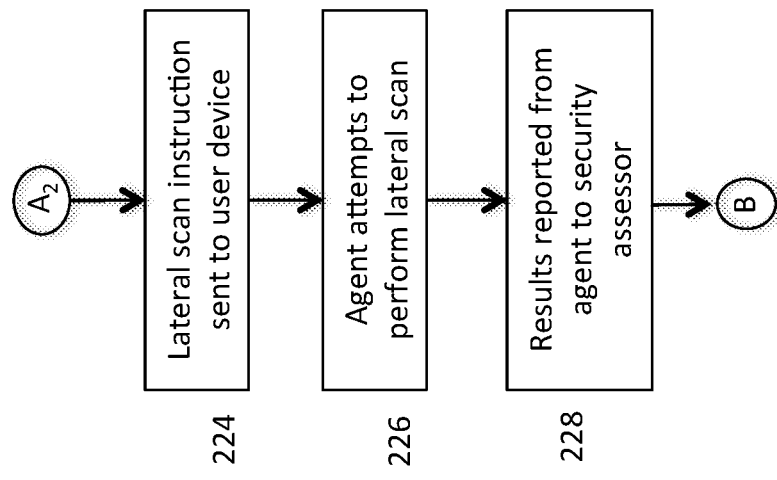
Figure 2B:
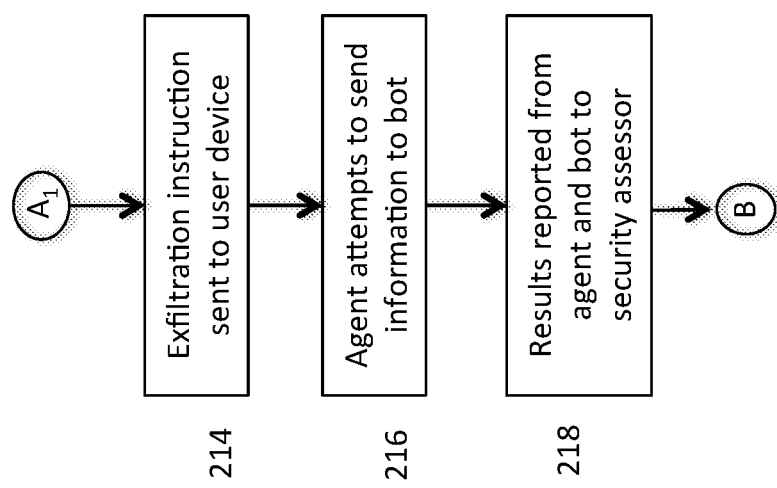

FIGS. 2B-2D illustrate different exemplary simulations that may be performed once the agent begins a simulation session. As an example, in FIG. 2B, an exfiltration instruction is sent to a user device (step 214). As a result, the agent at the user device attempts to send information out of the entity's network (e.g., sub-network 150), for example to a bot (e.g., 130a or 130b) outside of the sub-network (step 216). A success may indicate an exfiltration security breach, while a failure may indicate a sufficiently secure network. In step 218, results of the simulation may be reported to the security assessor. For example, the agent and/or the bot may store records of successful or failed breaches, such as whether and what data is exfiltrated during the simulation, and may report that information to a command and control server 120a or 120b or to security assessor central server 110. In one embodiment, for example, when an agent sends a request (e.g., an HTTP Post or Get command), it receives a response. The response may be, for example, an acknowledgement indicating that the bot received the exfiltration data.

As another example, in FIG. 2C, a lateral scan instruction is sent to a user device (step 224). As a result, the agent at the user device attempts to perform a lateral scan of one or more different devices, such as a user device or other computer within the entity's network (e.g., sub-network 150) (step 226). In certain embodiments, there are three different levels of success for an attempted lateral scan: success; partial success; and failure. For a failure (which may indicate a more secure system), the agent discovers that in response to it's lateral scan attempt, it receives no information about the network, such as the number of devices, addresses of those devices, etc. In a partial success, the agent may discover, for example, a number of user devices on the network, and IP addresses, but does not find more information about those devices. A success would indicate a lateral scan resulted in additional information of the devices on the network being discovered, such as IP addresses, operating system information about the user devices, other services information, etc. In step 228, results of the simulation may be reported to the security assessor. For example, the agent may store a record of a success, partial success, or failure, including, for a successful security breach, what data is obtained, and/or which devices were scanned during the simulation, and may report that information to a command and control server 120a or 120b or to security assessor central server 110.

In FIG. 2D, a DNS exfiltration instruction is sent to a user device (step 234). DNS exfiltration involves including the data to be exfiltrated in the name of the network resource that is being accessed. As such it is not necessary to actually connect to the destination device in order to exfiltrate the data. This gets around certain controls, such as firewalls, that might otherwise prevent connections from being made.

For example, in the case of an illegitimate external site (e.g., badguy.com), the site might have already had its IP address blocked. However, if DNS is unfiltered, it is possible for a threat actor on the internal network to exfiltrate data by trying to connect to, for example: myvisanumber.badguy.com (wherein an actual credit card of a user of a user device is included in the domain name). Since the data to be exfiltrated (myvisanumber) is actually part of the host name, the request will be made through the Internet to resolve myvisanumber.badguy.com into an IP address. Despite the fact that a sub-network's firewall may block the illegitimate website's IP address from being reached, the DNS request itself contains the exfiltrated information and thus once it is successfully made, the connection to the illegitimate website is unnecessary. Other forms of these requests can carry significant payloads, and the payload can be encoded to prevent obvious detection.

In the context of FIG. 1, a DNS exfiltration attempt may include, for example, agent 156 sending an address including exfiltration data to an entity DNS server 152, the entity DNS server 152 forwarding the request to an Internet Service Provider (ISP) DNS server to get the IP address of the domain name (step 236), and then the ISP DNS server sending the domain name to the security assessor DNS server 140 (step 238). At that point, the security assessor DNS server 140 has exfiltrated the data, whether or not any response from it back to the entity DNS server 152 is blocked. In some cases, a valid-looking response can be sent back to the user device where the agent 156 resides, so that it does not appear that any security breach occurred.

If the attempt to exfiltrate the data is not successful, this may indicate that the security measures in place at the entity DNS server were adequate in stopping a security breach. In step 240, results of the simulation may be reported to the security assessor. For example, results received by the agent and/or the security assessor DNS server may send an indication of whether or not a request was received from the entity DNS server with exfiltration data.

In certain embodiments, the security assessor maintains details data about actions taken in connection with security simulations on the network 10 and sub-networks of the network. For example, the security assessor may maintain logs of data (e.g., forensics data) for all communications or processes carried out as a result of simulations by any of the computers or program code under the security assessor's control (e.g., agents, bot servers, DNS servers, etc.). The logged data may include any information used to or sufficient to determine actions of agents, bot servers, and other security assessor-controlled devices or programs on the network. The logged data may include, for example, packet-level information such as data contents included in communications (e.g., exact data contents), to and from addresses of communications (e.g., both for internal and external networks), and timing information, which may be synchronized to universal time for precise record-keeping. In addition, for large files, data as well as the hash value for the data may be logged. In certain embodiments, the logged data is sent to a storage on one of the command and control servers 120*a* or 120*b*, or on central server 110. This logged information may be used, for example, for correlation procedures, described in greater detail below, and also may be used to replay certain actions for security assessment.

In order to better determine whether reported successes and failures of TTP simulations are accurate, the results received by agents may be correlated (e.g., cross-correlated) with results received by bots, security assessor DNS 140, and/or by other system components. In certain embodiments, these results may be sent to a command and control server 120*a* or 120*b* for analysis. For example, for exfiltration data, if an agent at a user device receives an exfiltration "success" indication, this may be correlated with data indicating whether the associated bot server received the exfiltration data (e.g., both data may be sent to a command and control server 120*a* or 120*b*). If there is no match (for example, the bot server reports a "failure"), this could indicate that the data was not actually exfiltrated. For example, a proxy device may have reported the "success" to the agent but then the exfiltration data was stopped by a security filter between the proxy and the bot server.

Additional correlations can be performed as well. For example, a security event and incident monitor on a sub-network, which monitor may be run by the entity associated with the sub-network or by a service provider of that sub-network, for example, may serve as a logging system to record network and security events, such as violations of policy which may include information being sent through the sub-network that should not have been sent, information being sent to an address where it should not have been sent, etc., which may correspond to exfiltration events, lateral scan events, etc. As such, this monitoring system is aware of certain potential security issues that have occurred. The information stored by that system may additionally be cross correlated with the agent-created, bot-created, and/or other security assessor-created information (e.g., stored in the security assessor's log) to determine what types of information the network security system is aware of and which it is not aware of, etc. Ultimately, people associated with the network, such as IT team members, network security members, etc., can be contacted to assess the visibility of potential entity security threats to human administrators, to assess the ability of these administrators to analyze and/or reconstruct actions that have occurred on the entity network, and to assess actual human response to potential security threats.

In some embodiments, this monitoring system may be a third party system that monitors an entity's network and logs security-related events. Some third party systems may allow for queries on their collected security-related log, in order to search for metadata or artifacts involved in potential security breaches, like IP addresses, time stamps, credit card numbers, etc. In one embodiment, the script running the agent on the end device browser includes code that presents results of a security assessment as a clickable list, as shown in FIG. 3. Certain artifacts (e.g., pieces of metadata) can be clicked on, such as credit card number, IP address, timestamp, etc., and as a result, the script generates a search query for the third party system for the specifically selected artifact. A search can then be executed (either automatically or by asking a user to click a link) by sending the query to the third party system. In some embodiments, results of that third party query indicate whether or not the third party system detected any security breach related activity related to the artifact searched for. For example, if a user selects (e.g., clicks) an IP address from the security assessment list, a query to a third party security system can be generated by the script on the end device browser specifically related to that IP address. The third party can then run a search, for example, on its log of security-related activity, to see if any activity was detected for that IP address. Results can be returned to the end device browser. For example, if the third party system detected credit card exfiltration information for that IP address, results can be shown on the end device browser. This feature is particularly useful as a check to ensure that the third party system is recognizing the security tests that the security assessment script is executing.

The security assessor system may include one computer, such as a server configured via various software and hardware to implement all of the functions described above in connection with security assessor central server 110, command and control servers 120*a* and 120*b*, bot servers 130*a* and 130*b*, and security assessor DNS 140. Or the security assessor system may include a plurality of computers in communication with each other and configured to implement the functions described above in connection with security assessor central server 110, command and control servers 120*a* and 120*b*, bot servers 130*a* and 130*b*, and security assessor DNS 140.

For example, in some embodiments, the command and control server and a bot server or DNS server may be processes in the same computer with the same network address. In other embodiments, the command and control server and each bot server or DNS server are on separate computers with different network addresses. The command and control servers and the bot servers may also be housed at the same computer with the same or different network addresses.

As described above, the target network uses an agent, which can be loaded and executed in a standard web browser, to communicate with command and control servers and then a bot server. Instructions may be received by the agent from a command and control server in Threat Object Notation (ThreatON), which may be a domain specific language for describing threat actions. This language may be specific to the simulation platform, which provides for more comprehensive analysis and assessment of a network's security risks. The target system then acts upon the ThreatON instructions, performing actions in the ThreatON instructions, and may report certain results back to the command and control servers. Actions may include, for example, network actions performed on the target network or to one or more bot servers (e.g., these actions may be indicative of TPPs from threat actors, or in some cases, indicative of cyber attacks or network security breaches).

In one embodiment, the command and control server communicates with the bot servers and the target system to calculate the effectiveness of the simulated actions and assess the defensive posture, as described above with regard to the correlations and cross correlations.

One or more of the simulations shown in FIGS. 2B-2D may be performed, and they may be performed consecutively based on different requests for instructions, or simultaneously. Other simulations of cyber attacks may be performed as well—the examples in FIGS. 2B-2D are merely three examples, and various other known types of cyber attacks and security breaches may be simulated. For example, multiple agents (e.g., at different user devices) can be used in a coordinated manner to carry out related instructions (for example, one agent may receive instructions for communicating with other agents). In this manner, large-scale security breaches or attacks can be simulated.

Figure 2E:
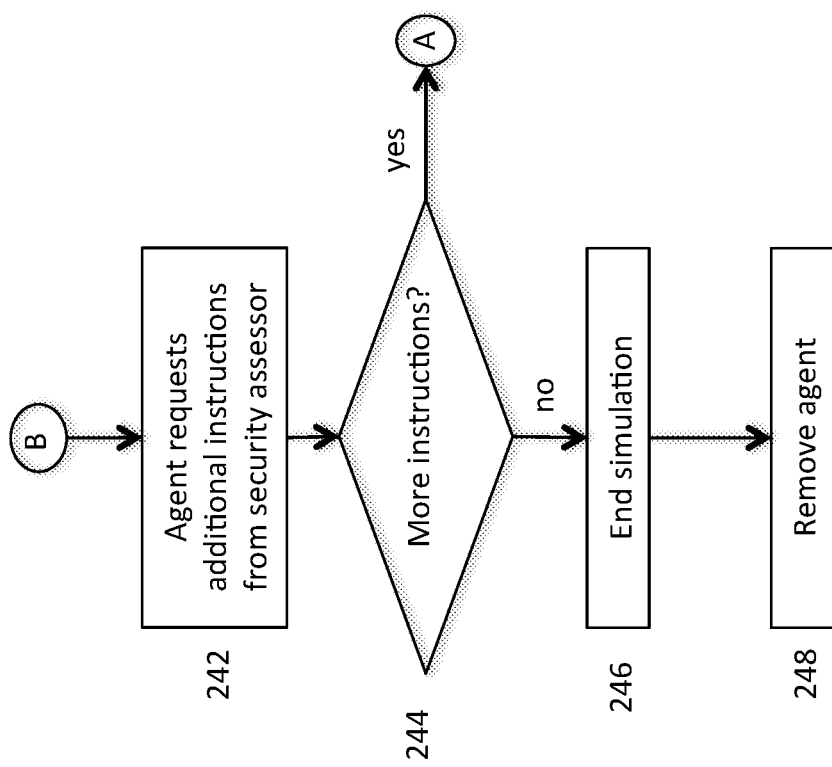

In certain embodiments, when a set of instructions from the security assessor have been completed by an agent, as shown in FIG. 2E, the agent may request additional instructions from the security assessor (step 242) (for example by making a request to a command and control server 120*a* or 120*b* or a security assessor central server 110). For example, the agent may receive one instruction or a plurality of instructions simultaneously, and then may perform those instructions, and then subsequently receive additional instructions and perform those. In certain embodiments, after one or more instructions have been completed, an agent immediately requests more instructions. In some embodiments, an agent may be instructed to wait a certain period of time after completing a first set of instructions before requesting a second set of instructions. For example, after a set of instructions have been completed, the security assessor may check the entity profile along with the time, to determine if additional simulations should be carried out and additional instructions should be sent to the agent. If so (step 244, yes), then another simulation may be performed (in some cases after a pre-set time period). If not (step 244, no), then the simulation session ends (step 246).

As discussed above, in step 248, the agent may be removed from the user device, for example, based on a navigation from the accessed web page, a closing of the browser window, and/or a closing of the browser application. In certain aspects, the agent (i.e., program code) that causes and executes initiation of the security simulation is only temporarily stored at the user device in accordance with browser rules dictating how executable program code such as JavaScript shall be automatically and permanently deleted. As such, the temporary storage need not require any interaction by the user for removal of the script. For example, certain browsers are configured to automatically delete any executable code that is expired upon navigating from a web page, closing the browser window, closing the browser application, or performing certain other actions. In certain embodiments, for example, the agent program code may be stored in a browser cache, wherein the browser includes instructions to automatically delete certain files from the cache (e.g., files with overdue expiration dates) upon certain occurrences (e.g., at certain times, when a browser application or window is closed, a web page is navigated away from, etc.).

FIG. 2F illustrates an example method where use of a script tag or e-mail link may be used to allow an agent to be executed by a browser application to collect information of the user devices (154*a*, 154*b*, 154*c*) of the entity and to send the collected information to the security assessor. The collected information may be sent to the security assessor through the firewall 151 of the entity's sub-network 150 in a manner that allows the security assessor to identify the user device associated with the collected information. The method is described with respect to only a single user device (generically referenced as 154 to represent one of 154*a*, 154*b* or 154*c*, e.g.) for ease of description, but is applicable to simultaneously (or sequentially) be implemented with plural user devices of the sub-network 150.

Steps 202, 204 and 206 of the method of FIG. 2F may be the same as described herein and their description is not repeated here. In step 250, in response to the request in 206, which may be performed by a web browser application (browser) of the user device, a first script is sent from the security assessor to the user device.

In step 250, the first script is executed in the browser 155 of the user device 154. The first script may collect information about the user device 154. For example, the browser 155 may execute the first script to collect information about the software installed and/or running on the user device 154, the hardware of the user device 154 and/or detected vulnerabilities of the user device 154 (referred to herein as "collected user device information" or "user device information"). For example, the software information of the user device 154 collected may include (i) identification of the operating system software, malware protection software, internal network communication software (e.g., VPN software), web browser application software, existence of Java or other specific software, of installed and/or operating on the user device 154, (ii) the versions of this software (e.g., to determine if the latest version has been updated), (iii) software patches associated with this software and/or (iv) settings of such software (e.g., automatic update settings, security settings preventing connections to certain websites, encryption settings, etc.) All of this may be described generally as software attribute information (which is different from, for example, user information stored on the user device 154, or user data stored on the device). For example, the hardware information of the user device 154 may include, for example, identification of hardware used by the user device 154 to communicate to an external device (e.g., network access point hardware (including wireless and wired network access point hardware), which may be described as hardware attribute information.

Vulnerability information collected may include determining that certain of the software and/or hardware attribute information collected indicates a security vulnerability, such as (i) installation of software on the user device that no longer is supported by a software vendor (e.g., software that the software vendor who sold the software is no longer providing software updates), (ii) software that has not been updated with the latest version provided by the corresponding software vendor, (iii) software and/or hardware that is not configured with appropriate security protection settings, (iv) the identification of malware on the user device, (v) the identification of particular software or hardware known to be security risks (e.g., due to the ability to of hackers to exploit certain features of the software or hardware). Thus, this vulnerability information may include computer program information, such as information about software applications and/or operating systems. Vulnerability information may also include identification of the presence of capabilities of the user device (e.g., the ability to communicate (or have a particular type of communication) with other devices of the sub-network 150 or to sources external to the sub-network (e.g., restricted websites) that should be restricted from the user device, or the absence of capabilities of the user device (e.g., the inability of the user device to detect external access to data stored on the user device). Information collected may also include information of the user device 154 that may not represent a network security vulnerability but may indicate an undesirable characteristic of the user device 154 and/or sub-network 150 (e.g., insufficient cache memory of the user device 154, software or hardware that occupies too much network bandwidth, etc.) In step 252, the first script run on the browser of the user device causes the browser 155 of the user device 154 to send the collected user device information to the security assessor through the firewall 151 of the sub-network 150 along with identifying information of the user device (to allow determining what user device the collected user device information is describing and/or what user device collected the device information). The first script run by the browser 155 causes the browser 155 to send one or more DNS requests (also referred to as DNS queries) via network 10 to the domain name system server (DNS server) 140 of the security assessor. As is known, a DNS request (also referred to as a DNS query) is a request by an internet application (e.g., web-browsers and e-mail applications) transmitted to various DNS servers (which may be part of the sub-network 150 or an external server of the Internet) so that the internet application may receive the appropriate numerical IP address of a particular internet domain name (and thus use this numerical IP address of the domain name to access the website identified by the domain name). In this example, a DNS server 152 of network 150 may first be queried by the user device 154, which may direct (or forward or link) the DNS request to DNS servers on the Internet 10 (not shown), which may direct (or forward or link) the DNS request to the security assessor DNS server 140 for the full numerical IP address associated with the domain name of the DNS request. The user device 154 may also first consult a cache of the browser 155 and/or a DNS resolver of the user device 154 and/or of the sub-network 150 to initiate the DNS request to determine if the DNS resolver has some of the IP address information related to the DNS request. Information regarding DNS requests, including DNS servers and DNS resolvers may be found at https://en.wikipedia.org/wiki/Domain_Name_System#Address_resolution_mechanism which was submitted as an Appendix to U.S. Provisional Patent Application No. 62/363,537, to which this application claims priority, and which is incorporated by reference herein. Each of the Request for Comments (RFC) documents listed in the Appendix is incorporated by reference at least to the extend they describe DNS related methods (e.g., DNS requests) and systems (e.g., DNS resolvers, DNS servers and their interconnections, actions and interactions) that may be used in conjunction with this invention.

In this example, the first script run by the browser causes the browser to send one or more DNS requests, where each DNS request itself provides all or part certain of the collected user device information. The DNS request exfiltrates such collected user device information in the manner similar to that previously described so that the information may be analyzed for possible security vulnerabilities. For example, domain name system server 140 of the security assessor may be identified by the domain name "beacon.ms" and be set up to receive DNS requests for domain names ending in "beacon.ms". Thus, a browser sending a DNS request for "chrome.browser.software.beacon.ms" will have its request eventually directed to (via DNS servers of the Internet) the domain name system server identified by "beacon.ms" (e.g., Security Assessor DNS 140) typically intended to allow this Security Assessor DNS 140 to provide the browser of the user device 154 a proper numerical IP address associated with "chrome.browser.software.beacon.ms". As can be appreciated, the domain name "chrome.browser.software.beacon.ms" can be used to communicate the collected user device information (in this example, that the user device includes the browser software "chrome"). As the domain name system server 140 (here "beacon.ms") receives the full domain name as part of the DNS request, the Security Assessor DNS 140 is provided with the user device information collected by the browser 155 of the user device 154. The browser 155 of the user device 154 may issue multiple differently named DNS requests to be resolved by DNS servers of the Internet 10 (e.g., "https://flash.plugin.software.beacon.ms" and "https://os-x-yosemite.os.software.beacon") to identify other collected information of the user device 154. The DNS requests need not textually identify the collected information and may instead be represented by alpha-numeric codes that are known to represent a particular characteristic of a user device (e.g., code "16.31" represents the user device runs antivirus software "Virus Detect, version 31"). In addition, it will be apparent that several sets of collected information may be sent by a single DNS request (e.g., https://flash.87.os.10.6.browser.4.beacon.ms). Although the DNS request sent by the user device 154 is designed to return a numerical IP address from the Security Assessor DNS 140 to the user device 154, such step may be omitted if desired (or replaced with another communication to the user device 154, such as a communication that no IP address is associated with the DNS request to avoid unnecessary waiting and/or repeat requests by the web browser 155).

The DNS request also includes identifying information of the user device 154 that sent the DNS request. As each DNS request is generated to receive a reply containing the numerical IP address (so that it may be used by the DNS requesting device), the DNS requests are generated by the browser of the user device with an IP address associated with the user device so that such information may be used by the DNS servers to communicate the correct answer back to the requesting user device.

The DNS requests (including the collected information of the user device and the identification of the user device) sent to the security assessor may also be directly monitored by the entity. Specifically, the entity DNS server 152 may monitor DNS requests internally generated by user devices 154 of the sub-network 150. FIG. 2I illustrates a flowchart of a method where the DNS requests are both sent to the security assessor DNS server (here "vThreat DNS server") and monitored by sub-network ("internal DNS monitoring logs request" which may be performed by DNS server 152 of the sub-network 150). The other steps in the flowchart of FIG. 2I may be the same as described herein.

For example, in step 302, a first script, or code, loads in a browser and checks for flaws (e.g., about the software, hardware, and/or vulnerabilities) of the user device 154. In step 304, it is determined if the first script has collected any system attributes, such as hardware, software, and vulnerability information (e.g., related to these flaws). In step 306, if system attributes have been collected, the first script initiates (e.g., formulates) a GET request in a browser context, in order to form information to send in a DNS request. The DNS request may include a URL that includes a destination such as "beacon.ms," which is a destination of a security assessor computer. In step 308, the browser initiates a coded DNS request based on the GET request, and thus sends the request, for example, initially via its internal network. In step 310, an internal DNS, such as entity server 152 receives the request and can log the request and the information contained therein. In step 312, an external DNS, which may be a security assessor DNS, receives the request, and also logs the request and the information contained therein.

The DNS server 152 may be part of the network defense system of sub-network 150 and used to block DNS requests and user device access (communications) with associated with known (or not approved) domain names. The DNS server 152 may also automatically log any DNS request internally generated by the sub-network 150 requesting an IP address of the domain name of the security assessor or other pre-determined domain name. Thus, in this example, the DNS server 152 may monitor all such DNS requests for an IP address of any domain name ending in "beacon.ms". When such a request is detected, the DNS server 152 may record the request and extract the collected user device information and the identifying information of the user device associated with the collected user device information that is embedded in this DNS request. Thus, the entity may immediately act on such collected user device information without requiring a report be generated and sent by the security assessor to the entity. For example, the entity itself may generate such a report and determine what collected user device information is considered to represent a vulnerability or otherwise undesirable characteristic of the network (e.g., causing poor network speed due to certain software or hardware of the user device demanding too much bandwidth). In addition, such collected user device information may be reanalyzed and used at a later date to modify user devices (e.g., when a security flaw is later revealed in certain software).

Based on the one or more DNS requests sent by the user device 154 to the security assessor DNS server 140, the security assessor and/or entity may determine if the user device 154 exposes the network sub-system 150 of the entity to a security risk. The security assessor and/or entity may determine if any vulnerability information has been sent by the user device 154, for example. In addition, the security assessor and/or entity may analyze other information sent by the user device 154 to determine if such information represents a vulnerability of or other undesirable trait of the network sub-system 150 of the entity. In one example, the security assessor and/or entity may compare the collected information identifying software and hardware to a collected list of software and hardware that are known to provide a security risk and when there is a match, cause a report to be generated and issued to the entity. For example, a log listing detected vulnerabilities may automatically be generated and sent to the network data security system 153, and/or an e-mail identifying detected vulnerabilities may automatically be generated and sent to the cyber-security and/or IT personnel of the entity. The report may also automatically generate a list of modifications (e.g., software updates, software deletions, software setting changes) for each user device that should be implemented by the entity (e.g., the entity's IT personnel).

The DNS request also includes identifying information of the user device who sent the DNS request. Thus, the DNS request generated by the user device in step 252 may also include information that identifies the user device 154 that sent the DNS request and thus the identity of the user device 154 which is associated with the collected information. Thus, the report that is automatically generated and sent to the entity may also identify the user device 154 associated with the information (e.g., detected vulnerability). It will be appreciated that while the method of FIG. 2F is described with respect to a single user device 154, it is applicable to multiple user devices 154 (e.g., of the sub-network 150). Thus the report that is generated and sent to the entity may include different information sets collected and processed as described herein, each information set being associated with different ones of multiple user devices. The report may also identify system wide vulnerabilities (e.g., associated a collection of and/or determining a number of user devices including a certain vulnerability).

FIG. 2G illustrates additional steps that may be performed after step 252 in the method of FIG. 2F. Specifically, in step 254, it is determined whether the first script executed by the browser identified a vulnerability, or whether separate analysis of the collected user device information received by the security assessor in steps 252 identifies a vulnerability. In step 258, the DNS request transmitted by the user device 154 with the collected user device information to the DNS server of the security assessor in step 252 is analyzed to identify the user device 154. The identified user device 154 is then modified to address the identified vulnerability. The modification of the user device 154 may be done automatically (e.g., by sending a script to the user device 154 to be executed by the browser application 155 of the user device 154 to cause a software update or a settings change in the current software installed on the user device). The modification of the user device 154 may be done by sending a script to the user device to display a message and/or provide a Uniform Resource Locator (URL) via the browser application 155 to the user of the user device 154 (e.g., "Update needed for software 'XYZ'—please click link here to start update"). The modification may also be done by IT professionals of the entity by consulting the report sent to the entity. It will be appreciated that the modification to the user device 154 may occur after steps 256 and/or 248.

In step 256, the assessment of the sub-network 150 may end. In step 248, the first script may automatically deleted from the user device 154 as described herein.

Figure 2H:
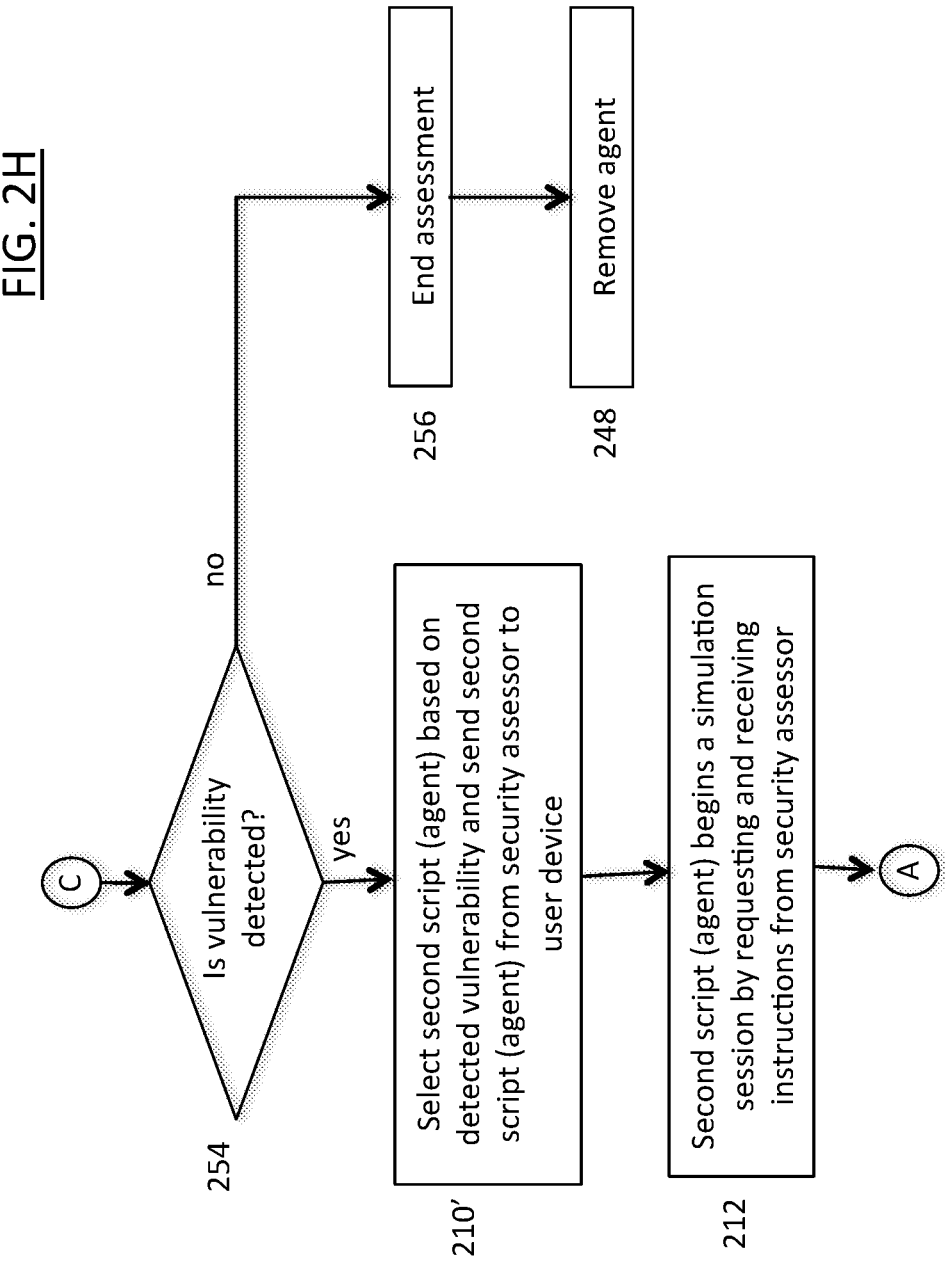

FIG. 2H illustrates additional steps that may be performed after step 252 in FIG. 2F. In step 254, the security assessor may determine whether or not a vulnerability has been detected. If no vulnerability has been detected, the security assessment may end in step 256 and the first script may automatically be deleted from the user device 154 as described herein.

If a vulnerability is determined to be detected in step 254, in step 210' a second script is selected and sent to one or more user devices. The second script may be selected in step 210' based on the detected vulnerability. In step 212, the second script may be executed by the browsers of the one or more user devices 154 as described herein with respect to step 212 of FIG. 2A and FIGS. 2B-2E. As the second script selected to simulate the network attack may be selected based on a detected vulnerability, the security defenses of the sub-network 150 may be tested based on an actual vulnerability of the network, providing better analysis and relevant reporting of the security defenses. For example, certain vulnerabilities may be known to be more susceptible to exfiltration, so if a vulnerability assessment of a user device results in a determination that the user device has vulnerabilities that are susceptible to exfiltration, than an agent may be sent to the user device that specifically seeks to exfiltrate data. It will be appreciated that the methods of FIGS. 2G and 2H may both be performed or only one of FIGS. 2G and 2H may be performed.

In this manner, a security assessor may use a two-step process to evaluate the security of an entity's network. The first step may include a vulnerability assessment that determines the vulnerabilities of the entity's network (e.g., of individual user devices and/or other devices of the network). Device capabilities in addition to vulnerabilities may be assessed in the first step. The vulnerabilities assessment may be performed, for example, using code that loads into a browser at the user devices. In the second step, based on the determined vulnerabilities, particular security tests may be performed on the devices that include those vulnerabilities. For example, the security tests may be performed using agents sent to the user device and run in a user device browser. Each user device may be sent a specific agent script particular to the vulnerabilities that were determined for that user device.

According to certain exemplary embodiments such as described above, because a code such as a <script> tag can be placed on an entity's website (e.g., on an internal network homepage of a company), this can provide for a highly scalable security assessment and simulation. For example, simulations can be run at certain times of day such that hundreds or thousands of computers can simultaneously run the simulations, thereby simulating a large-scale cyber attack. In addition, a number of features of the disclosed embodiments reduce actual security risk to entities who run simulations and assessments. For example, because the simulations are initiated through and run through web browser applications, the simulations are less likely to reach the core components of the user device and other entity computer operating systems. Also, according to certain embodiments, because the code used to initiate and execute the simulations is received by and executed within a browser application environment, as soon as the web page running the code or script is navigated away from, or the browser window is closed, the script will stop executing. Further, the script can be set to have an expiration date that causes the browser application to permanently delete the code associated with an agent as soon as the web page is navigated away from or the browser window is closed. These safeguards prevent a potential malicious code from remaining on the user device for significant periods of time.

The various embodiments provide the additional benefit of allowing a single trusted security assessor to control all aspects of the security simulations, thereby ensuring that important entity data is not actually compromised. Also, because the security assessor knows what types of simulated attacks are being carried out, it can better monitor whether the security of the network is breached to determine whether the entity's network is secure.

As a result of the above embodiments, an improved assessment and simulation platform has the ability to simulate threats in a manner consistent with real-world threats, inside of an organization's network, thus providing broad coverage and high levels of confidence that the assessment is accurate. Further, this assessment platform automates the assessment process, providing on-demand and continuous monitoring of changes in the security posture of the network. This provides a number of key advantages over existing assessment mechanisms such as vulnerability scanning, tabletop exercises, and penetration testing.

The assessment platform according to various embodiments provides continuous testing, which stimulates responses from all of the security defenses existing in the network as if they were responding to actual threats. Because the tests can be carried out in a coordinated fashion, for example according to pre-set schedules, and from within a target network, an accurate and near-real-time view of the network defenses can be obtained in depth. Known threats may be simulated in a realistic fashion, allowing testing of the effectiveness against attacks which have been used in the past, and new threats may be created allowing testing of heretofore unused, but theoretically available threats. By testing each of these, in turn, the assessment and simulation system described in the various embodiments above can provide a more accurate view of the true defensive posture of an organization.

We claim:

1. A security assessment system for a computer network, comprising:
   one or more security assessment computers controlled by a security assessor, and connected to a network; and
   first executable program code for acting as an agent on a first end device on the network, the first executable program code configured to be executed by a browser application of the first end device,
   wherein the first executable program code is configured to obtain information about the first end device and transmit the same via a DNS request to the one or more security assessment computers; and
   wherein the first executable program code is configured to be automatically deleted from the first end device in response to one or more of: passage of an expiration date, the browser application exiting a webpage, a browser window associated with the browser application being closed, and the browser application being closed.

2. The security assessment system according to claim 1, wherein the first executable program code is configured to receive instructions from the security assessor for performing a simulation session.

3. The security assessment system according to claim 2, wherein the instructions for performing the simulation session include one or more of an indication of operations to perform, an indication of target destinations, an indication of information to be to be retrieved, an indication of information to be distributed, and an indication of timing for the simulation session.

4. The security assessment system according to claim 1, wherein the information about the first end device includes one or more of information about software installed on the first end device, information about hardware of the first end device, and information about detected vulnerabilities of the first end device.

5. The security assessment system according to claim 1, wherein the DNS request includes identifying information of the first end device.

6. The security assessment system according to claim 1, further comprising:
   second executable program code for acting as an agent on the first end device, the second executable program code configured to be executed by the browser application of the first end device;
   wherein the second executable program code is selected based on a vulnerability detected in connection with execution of the first executable program code.

7. The security assessment system according to claim 6, wherein the second executable program code is configured to simulate a network attack on the first end device.

8. A computer program product residing on a non-transitory computer readable medium having a plurality of instructions stored thereon, which, when executed by a processor, cause the processor to perform operations comprising:
   receiving, by a first end device on a network, first executable program code for acting as an agent on the first end device, the first executable program code configured to be executed by a browser application of the first end device,
   wherein the first executable program code is configured to obtain information about the first end device and transmit the same via a DNS request to one or more security assessment computers; and
   wherein the first executable program code is configured to be automatically deleted from the first end device in response to one or more of: passage of an expiration date, the browser application exiting a webpage, a browser window associated with the browser application being closed, and the browser application being closed.

9. The computer program product according to claim 8, wherein the first executable program code is configured to receive instructions from a security assessor for performing a simulation session.

10. The computer program product according to claim 9, wherein the instructions for performing the simulation session include one or more of an indication of operations to perform, an indication of target destinations, an indication of information to be to be retrieved, an indication of information to be distributed, and an indication of timing for the simulation session.

11. The computer program product according to claim 8, wherein the information about the first end device includes one or more of information about software installed on the first end device, information about hardware of the first end device, and information about detected vulnerabilities of the first end device.

12. The computer program product according to claim 8, wherein the DNS request includes identifying information of the first end device.

13. The computer program product according to claim 8, further comprising:
   receiving second executable program code for acting as an agent on the first end device, the second executable program code configured to be executed by the browser application of the first end device;
   wherein the second executable program code is selected based on a vulnerability detected in connection with execution of the first executable program code.

14. The computer program product according to claim 13, wherein the second executable program code is configured to simulate a network attack on the first end device.

15. A computer-implemented method comprising:
   receiving, by a first end device on a network, first executable program code for acting as an agent on the first end device, the first executable program code configured to be executed by a browser application of the first end device,
   wherein the first executable program code is configured to obtain information about the first end device and transmit the same via a DNS request to one or more security assessment computers; and
   wherein the first executable program code is configured to be automatically deleted from the first end device in response to one or more of: passage of an expiration date, the browser application exiting a webpage, a browser window associated with the browser application being closed, and the browser application being closed.

16. The computer-implemented method according to claim 15, wherein the first executable program code is configured to receive instructions from a security assessor for performing a simulation session.

17. The computer-implemented method according to claim 16, wherein the instructions for performing the simulation session include one or more of an indication of operations to perform, an indication of target destinations, an indication of information to be to be retrieved, an indication of information to be distributed, and an indication of timing for the simulation session.

18. The computer-implemented method according to claim 15, wherein the information about the first end device includes one or more of information about software installed on the first end device, information about hardware of the first end device, and information about detected vulnerabilities of the first end device.

19. The computer-implemented method according to claim 15, wherein the DNS request includes identifying information of the first end device.

20. The computer-implemented method according to claim 15, further comprising:
   receiving second executable program code for acting as an agent on the first end device, the second executable program code configured to be executed by the browser application of the first end device;
   wherein the second executable program code is selected based on a vulnerability detected in connection with execution of the first executable program code; and
   wherein the second executable program code is configured to simulate a network attack on the first end device.

* * * * *